Patented Apr. 22, 1941

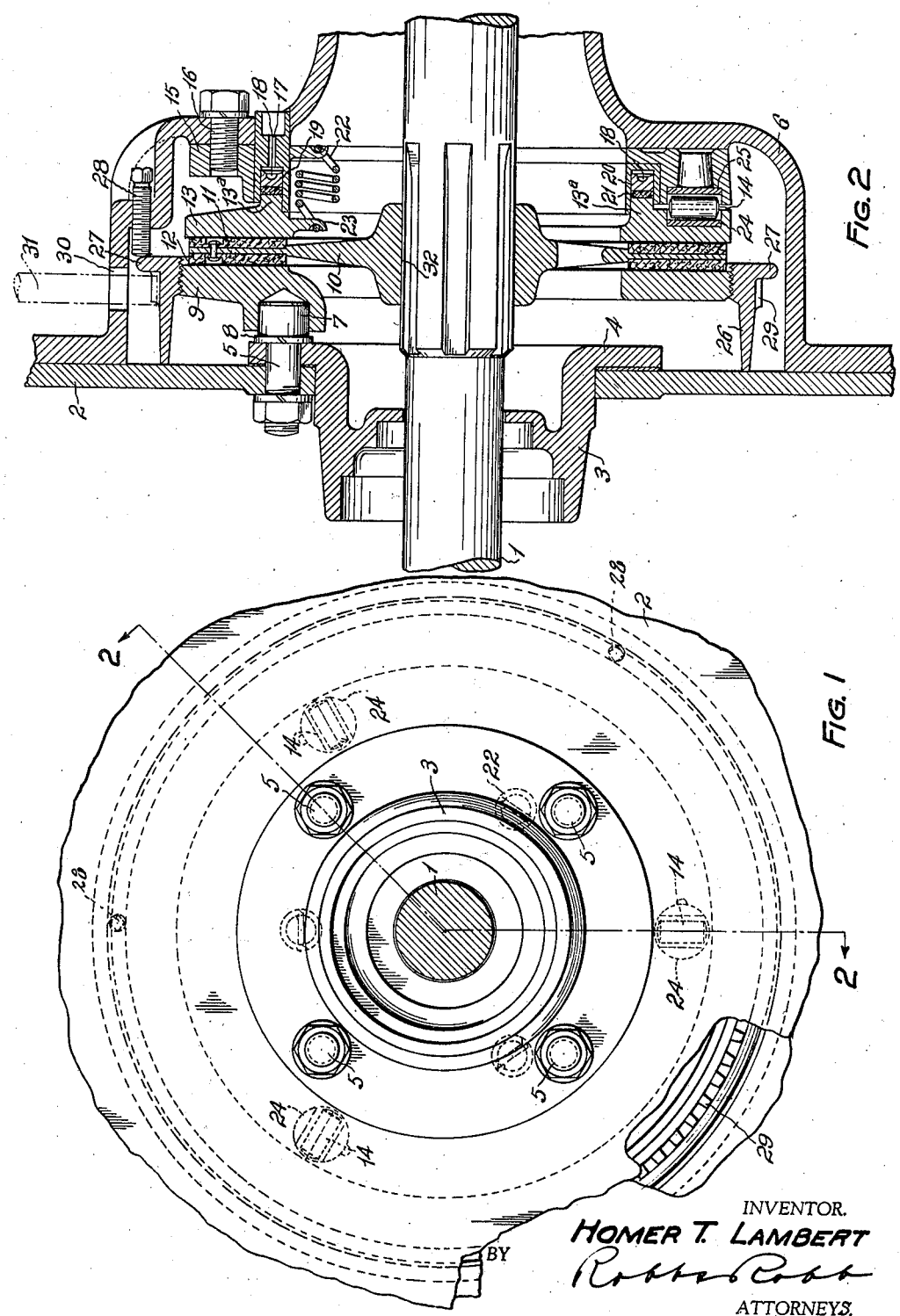

2,239,235

UNITED STATES PATENT OFFICE 2,239,235

BRAKE MECHANISM

Homer T. Lambert, St. Joseph, Mich.

Application March 2, 1940, Serial No. 322,023

4 Claims. (Cl. 188—72)

This invention embodies certain improvements in the type of disc brake generally disclosed in my previous Letters Patent No. 2,063,443, issued December 8th, 1936.

The improvements of the invention appertain primarily to the design of the brake mechanism by which a special novel mounting is provided for the relatively stationary brake disc, and there is associated with said disc new means for the adjustment of the disc in order to take up wear or effect an adjustment of said member relatively to cooperating rotating and relatively movable disc members.

My invention involves other details of construction of the parts of the brake means referred to which will be more apparent upon reference to the accompanying drawing, in which—

Figure 1 is a fragmentary view in elevation, looking toward a supporting plate or one side of the casing or housing that encloses the brake mechanism and which may be solely a brake housing or a portion of the transmission housing when the brake of the invention is applied to transmission mechanisms, a portion of the plate being broken away to show adjusting teeth or projections of one brake disc.

Figure 2 is a vertical sectional view bringing out more clearly the interior arrangement of the parts of the mechanism, dotted lines showing at the top of the view the method of introducing a tool for obtaining manual leverage against the adjusting ring for the relatively stationary brake disc in effecting adjustment of the latter.

Referring to the construction of my brake mechanism in detail, in the drawing 1 denotes a drive shaft surrounding which are arranged the brake mechanism parts. The shaft 1 may be the driving shaft of an automobile, or automobile axle, or a jack or like shaft of a transmission, or any driven member which is required to be retarded or braked in its movement by the action of the mechanism hereinafter described. The supporting plate 2 shown may be a side plate of a transmission housing or any other similar support and carries a hub portion 3 having a suitable bearing opening for the shaft 1 and provided with an annular flange 4 attached to the plate or support 2 by means of a series of bolts 5 illustrated as four in number but which may be of any suitable number.

At the side of the support or plate 2, opposite that from which the hub 3 projects, is a casing 6 that generally encloses the parts of the brake mechanism. The bolts 5 have their heads innermost or projecting within the casing 6, and the flange 4 is clamped against the adjacent side of the plate or support 2 by the cooperation of the head 7 of the bolt and a spring washer 8, the latter directly impinging the flange. The nut of each bolt 5 is at the side of the supporting plate 2 opposite that at which the head is arranged.

Within the casing 6 is disposed the relatively stationary brake disc 9. The disc 9 may be said to be relatively stationary in the sense that it does not move around axially or rotatively in the casing 6 in the working operation of the brake, but the member 9 is susceptible of adjustment, as hereinafter set forth, for the purpose of adjusting the friction of the brake or taking up wear of the brake parts. Said member 9 is carried by the heads 7 of the bolts, 5 which therefore perform the double function of supporting the relatively stationary disc member and attaching the part 3 to the plate 2. Associated with the brake disc 9 is the rotating brake member or disc 10, and applied to opposite sides of the outer portion of the latter, extending inwardly from the periphery, are the brake friction elements 11 and 12. The elements 11 and 12 may be attached or molded on the member 10 in any suitable manner according to approved practice, and the friction part 12 cooperates in the braking operation by its outer surface frictionally engaging the adjacent side of the brake member or disc 9.

At the side of the revolving brake member 10 opposite that on which the disc 9 is arranged is the relatively movable brake disc or member 13. The member 13 is dimensioned somewhat the same as the member 9 insofar as the brake friction area of these parts is concerned, and said member 13 coacts with the friction element 11 of the member 10 in a self-evident manner.

The brake disc or member 13 is relatively movable in the sense that it may be shifted axially relatively to the shaft 1, and moreover, it is mounted for slight rotative motion in order to perform, in conjunction with energizing rollers 14, a self-energizing or servo action later to be described.

With the above in view, the casing 6 is equipped with an annulus 15 attached in place on the inner end face of the casing by bolt means 16, and associated with said annulus is a fluid channel unit 17 which is formed to provide a fluid pressure chamber 18 by the introduction of the annular extension 13a of the plate 13 into the recess 20 of said unit, said extension 13a constituting a piston with which the flexible ring 19 and its backing plate 21 coacts.

Now normally the relatively movable disc 13 is pulled in a direction away from the rotating brake member 10 by means of a series of springs 22, each connected at one end to the inner portion of the annulus 15 and each connected at the opposite end to a lug 23 on the disc 13. The tension of the springs 22 is to tend to separate the parts 13 and 10 by relieving the friction between the part 13 and the friction surfaces 11 and 12.

It is notable that in the construction of the present brake mechanism there are used self-energizing devices that may be characterized as generally of the type as disclosed in my Patent No. 2,063,445, issued December 8, 1936. It is not necessary to describe in detail the energizing feature other than to indicate that the same includes the energizing rollers 14 previously mentioned and operating upon inclined surfaces of fixed inserts 24 carried by the disc 13, and rotatable inserts 25 on the annulus 15. The method of operation of these rollers 14 is generally known in the art and will be described later herein.

The adjusting means for the relatively stationary brake disc 9 are now set forth.

The peripheral portion of the disc 9 is formed with screw threads. Upon this portion of the disc is mounted the adjusting sleeve 26 provided at its inner edge portion with an abutment flange 27 adapted to be engaged by a holding or set screw 28, shown as mounted to screw into an opening in the peripheral portion of the casing 6. On the outer surface of the sleeve 26 are provided annularly disposed teeth or projections 29, and the upper portion of the casing 6 has an opening 30 therein through which may be introduced a suitable tool such as a screw driver or bar 31 of some sort for engagement with the teeth 29. Normally the edge portion of the sleeve 26 opposite the flange 27 has a bearing against the support or plate 2, see Figure 2, and is held from rotation by means of the screw 28. If it be desired to adjust the relatively stationary brake disc 9 to shift the same toward the rotative brake member 10 to obtain finer braking adjustment or to take up wear between the friction elements 11 and 12 and their respective cooperating brake discs, the screw 28 is first loosened or disengaged from the sleeve 26. Thereupon, by the use of the tool 31, illustrated in dotted lines in Figure 2, which is inserted in the opening 30, and having bearing against the walls of said opening, the sleeve 26 may be slightly rotated, and, having screw threaded engagement with the peripheral portion of the disc 9, the disc 9 may be moved toward and from the member 13 for the purpose above described. When the desired adjustment of the member 9 has been secured, the set screw 28 will be re-engaged with the sleeve 26 and the adjustment will be thus fixed so far as the disposition of the disc 9 is concerned. In its adjusting movement the disc 9 simply slides upon the heads 7 of the bolts 5 in a self-evident manner.

In operation, brake fluid is supplied to the chamber 18 or recess 20 that provides said chamber, and the pressure of said fluid exerted upon the piston portion 13a of the relatively movable brake disc 13 will force said disc into cooperation with the friction element 11 of the rotating disc or member 10. Since the member 10 is splined upon the shaft 1, as shown at 32, the member 10 in the above manner may be forced toward the relatively stationary brake disc 9 for braking engagement of the friction member 12 therewith. The member 13 being rotatable in the casing 6, upon initial application of the member 13 to the friction element 11 of the member 10, the frictional contact thus established will tend to turn the disc 13 rotatively. This brings into play the self-energizing feature of the mechanism generally known heretofore and described above, namely, the rollers 14 and their coacting inserts 24 and 25. The tendency of the rollers by slight rotative movement of the disc 13 is to ride up the inclines of the parts 24 and 25 and thereby to provide additional braking action of the part 13 in conjunction with the associated friction parts resulting in the auxiliary braking effect referred to and heretofore known in the art. Upon relieving the pressure on the braking fluid entering the passage 17, the springs 22 pull the disc 13 away from the part 11 and the brake mechanism is thus released.

Having thus described my invention, what I claim as new and desire to secure by Letters Patent of the United States, is:

1. In a brake unit of the class described, in combination, brake mechanism including a normally relatively stationary brake disc, relatively movable brake parts cooperative with said disc, a support, connections between the support and said brake disc permitting axial movement of the latter toward and from its cooperative brake parts, and an adjusting member engaging said brake disc for moving the same to different adjustments relative to its cooperating brake parts, said last mentioned member comprising a rotatable sleeve surrounding the disc and having a bearing against said support and having threaded connection with the said brake disc, separate releasable means for holding the sleeve against said support and preventing rotation of said sleeve.

2. In a brake unit of the class described, in combination, brake mechanism including a normally relatively stationary brake disc, relatively movable brake parts cooperative with said disc, a support, connections between the support and said brake disc permitting axial movement of the latter toward and from its cooperative brake parts, an annular adjusting member engaging said brake disc at its periphery for holding and for moving the same to different adjustments relative to its cooperating brake parts, a casing enclosing said brake parts and the adjusting member, the said adjusting member comprising a part having screw threaded connection with the brake disc and having a bearing against the support aforesaid, said adjusting member being provided with projections thereon engageable through the casing to facilitate turning of the member while bearing against the support to thereby adjust the brake disc and means engaging the periphery of said adjusting member and carried by said casing for holding said adjusting member in adjusted positions against said support.

3. In a brake unit, a casing, a supporting plate at a side of the casing, a shaft passing through the casing, a rotating brake disc affixed to said shaft to turn therewith and move axially thereof, a normally relatively stationary brake disc at one side of said rotating brake disc for cooperation therewith, means slidably supporting the last mentioned brake disc upon the supporting plate permitting axial movement of said disc relatively to the shaft, an adjusting sleeve mounted on the relatively stationary brake disc and having screw thread connection therewith, a set screw adapted to engage said sleeve and mounted on the casing, external projections on the sleeve engageable to facilitate turning thereof, and a relatively movable brake disc cooperative with the rotating brake disc and arranged on the side thereof opposite that at which the normally stationary brake disc is disposed.

4. In a brake unit of the class described, in combination, brake mechanism including a normally relatively stationary brake disc, relatively movable brake parts cooperative with said disc, a support, connections between the support and said brake disc permitting axial movement of the latter toward and from its cooperative brake parts comprising members on the support having heads and sockets formed in said brake disc for permitting axial movement only of said brake disc, and adjusting means cooperative with the disc and said support to hold the disc firmly at adjusted positions and for moving the same to different adjustments relative to its cooperating brake parts.

HOMER T. LAMBERT.